United States Patent
Kuybeda

(10) Patent No.: US 10,891,718 B2
(45) Date of Patent: Jan. 12, 2021

(54) SCENE-BASED NONUNIFORMITY CORRECTION USING A CONVOLUTIONAL RECURRENT NEURAL NETWORK

(71) Applicant: Adasky, Ltd., Yokneam Illit (IL)

(72) Inventor: Oleg Kuybeda, Portland, OR (US)

(73) Assignee: Adasky, Ltd., Yokneam Illit (IL)

( * ) Notice: Subject to any disclaimer, the term of this patent is extended or adjusted under 35 U.S.C. 154(b) by 155 days.

(21) Appl. No.: 16/275,577

(22) Filed: Feb. 14, 2019

(65) Prior Publication Data
US 2019/0180418 A1     Jun. 13, 2019

Related U.S. Application Data

(63) Continuation-in-part of application No. 16/058,643, filed on Aug. 8, 2018, now Pat. No. 10,699,386.
(Continued)

(51) Int. Cl.
*G06K 9/62*     (2006.01)
*G06T 5/00*     (2006.01)
(Continued)

(52) U.S. Cl.
CPC .............. *G06T 5/002* (2013.01); *G06K 9/46* (2013.01); *G06K 9/6262* (2013.01); *G06T 5/50* (2013.01);
(Continued)

(58) Field of Classification Search
CPC . G06T 2207/10048; G06T 2207/20084; G06T 2207/20081; G06T 2207/10016; G06T 5/002; G06T 5/50; G06K 9/46; G06K 9/6262; G06K 9/2018; G06K 9/40; G06K 9/6271; H04N 5/3651; H04N 5/33
See application file for complete search history.

(56) References Cited

U.S. PATENT DOCUMENTS 5,053,870 A    10/1991   Ito et al.
5,323,334 A    6/1994   Meyers et al.
(Continued)

OTHER PUBLICATIONS ("Recurrent convolutional neural network for object recognition", IEEE 2015, pp. 3367-3375 (Year: 2015).*
(Continued)

*Primary Examiner* — Amara Abdi
(74) *Attorney, Agent, or Firm* — M&B IP Analysts, LLC

(57) ABSTRACT

A method and apparatus for correcting nonuniformity noise in thermal images. The method comprises receiving a current image being part of a stream of thermal images; concatenating the current image from the stream of thermal images with hidden state images; processing, by a first convolutional neural network, the concatenated image to extract a number of feature channels; generating based on the feature channels at least a first multiplicative mask; processing, by a second convolutional neural network, a masked concatenated image to compute a weighting parameter, wherein the masked concatenated image is resulted by applying the first multiplicative mask on the concatenated image; and simulating, using the weighting parameter, an infinite impulse response (IIR)-style updating scheme to estimate the nonuniformity noise in the current image.

19 Claims, 8 Drawing Sheets

Related U.S. Application Data which is a continuation-in-part of application No. 15/989,779, filed on May 25, 2018.

(60) Provisional application No. 62/630,554, filed on Feb. 14, 2018, provisional application No. 62/543,108, filed on Aug. 9, 2017, provisional application No. 62/515,200, filed on Jun. 5, 2017, provisional application No. 62/552,620, filed on Aug. 31, 2017, provisional application No. 62/526,733, filed on Jun. 29, 2017.

(51) Int. Cl.
*G06K 9/46* (2006.01)
*G06T 5/50* (2006.01)
*H04N 5/365* (2011.01)
*H04N 5/33* (2006.01)

(52) U.S. Cl.
CPC .............. *H04N 5/33* (2013.01); *H04N 5/3651* (2013.01); *G06T 2207/10016* (2013.01); *G06T 2207/10048* (2013.01); *G06T 2207/20081* (2013.01); *G06T 2207/20084* (2013.01)

(56) References Cited

U.S. PATENT DOCUMENTS

| | | |
|---|---|---|
| 5,414,439 A | 5/1995 | Groves et al. |
| 6,759,949 B2 | 7/2004 | Miyahara |
| 7,199,366 B2 | 4/2007 | Hahn et al. |
| 7,683,321 B1 | 3/2010 | King et al. |
| 7,786,898 B2 | 8/2010 | Stein et al. |
| 8,067,735 B2 | 11/2011 | King et al. |
| 8,208,026 B2 | 6/2012 | Högasten et al. |
| 8,378,290 B1 | 2/2013 | Speake et al. |
| 8,384,783 B2 | 2/2013 | Strandemar et al. |
| 8,503,821 B2 | 8/2013 | Hogasten |
| 8,562,776 B2 | 10/2013 | Liberman et al. |
| 8,743,207 B2 | 6/2014 | Boulanger et al. |
| 8,981,966 B2 | 3/2015 | Stein et al. |
| 9,143,703 B2 | 9/2015 | Boulanger et al. |
| 9,251,595 B2 | 2/2016 | Bailey et al. |
| 9,292,909 B2 | 3/2016 | Högasten et al. |
| 9,508,124 B2 | 11/2016 | Bailey et al. |
| 9,565,371 B2 | 2/2017 | Johansson et al. |
| 9,635,220 B2 | 4/2017 | Foi et al. |
| 9,681,066 B2 | 6/2017 | Strandemar |
| 2003/0007074 A1 | 1/2003 | Nagaoka et al. |
| 2006/0279632 A1 | 12/2006 | Anderson |
| 2008/0197284 A1 | 8/2008 | Ebenstein et al. |
| 2010/0111412 A1 | 5/2010 | Högasten et al. |
| 2012/0312976 A1 | 12/2012 | Boulanger et al. |
| 2012/0320217 A1 | 12/2012 | Högasten |
| 2012/0321212 A1 | 12/2012 | Högasten et al. |
| 2013/0218500 A1 | 8/2013 | Durand et al. |
| 2014/0015921 A1 | 1/2014 | Foi et al. |
| 2014/0016879 A1 | 1/2014 | Högasten et al. |
| 2014/0037225 A1 | 2/2014 | Höasten et al. |
| 2014/0092257 A1* | 4/2014 | Hogasten ................. H04N 5/33 348/164 |
| 2014/0198218 A1 | 7/2014 | Afrooze et al. |
| 2014/0270563 A1* | 9/2014 | Bailey ..................... H04N 5/33 382/254 |
| 2014/0354825 A1 | 12/2014 | Johansson et al. |
| 2014/0355904 A1 | 12/2014 | Olsson |
| 2015/0009335 A1 | 1/2015 | Strandemar |
| 2015/0226613 A1 | 8/2015 | Bauer et al. |
| 2015/0312488 A1 | 10/2015 | Kostrzewa et al. |
| 2015/0332441 A1 | 11/2015 | Högasten et al. |
| 2015/0350567 A1 | 12/2015 | Parrish et al. |
| 2015/0355026 A1 | 12/2015 | Iguchi et al. |
| 2016/0104048 A1 | 4/2016 | Stein et al. |
| 2016/0203694 A1 | 7/2016 | Högasten et al. |
| 2017/0103279 A1 | 4/2017 | Hong et al. |
| 2017/0150070 A1 | 5/2017 | Johansson et al. |
| 2017/0262995 A1* | 9/2017 | Li ........................ G06N 3/0454 |
| 2018/0204314 A1* | 7/2018 | Kaplanyan ............... G06T 1/20 |
| 2018/0253839 A1* | 9/2018 | Zur ........................ G06T 7/0012 |

OTHER PUBLICATIONS

Choi, et. al., "Convolutional Recurrent Neural Networks for Music Classification", Fast IMPACt EPSRC Grant EP/L019981/1 and the European Commission H2020 Research and Innovation Grant AudioCommons, arXiv: 1609.04243, vol. 1, Sep. 14, 2016.

International Search Report and Written Opinion of International Searching Authority for PCT/US2018/034620, ISA/RU, Moscow, Russia, dated Aug. 27, 2018.

International Search Report and Written Opinion of International Searching Authority for PCT/US2018/039987, ISA/RU, Moscow, Russia, dated Oct. 16, 2018.

Liang, et. al., "Recurrent Convolutional Neural Network for Object Recognition", IEEE: State Key Laboratory of Intelligent Technology and Systems, TNlist, CBICR, 978-1-4673-6964-0/15, 2015, pp. 3367-3375.

* cited by examiner

SCENE-BASED NONUNIFORMITY CORRECTION USING A CONVOLUTIONAL RECURRENT NEURAL NETWORK

CROSS-REFERENCE TO RELATED APPLICATIONS

This application claims the benefit of U.S. Provisional Application No. 62/630,554 filed on Feb. 14, 2018. This application is also a continuation-in-part (CIP) of U.S. patent application Ser. No. 16/058,643 filed Aug. 8, 2018, now pending. The Ser. No. 16/058,643 claims the benefit of U.S. Provisional Application No. 62/543,108 filed on Aug. 9, 2017 and is also a continuation-in-part (CIP) of U.S. patent application Ser. No. 15/989,779 filed on May 25, 2018, now pending. The Ser. No. 15/989,779 Applications claims priority to: U.S. Provisional Application No. 62/515,200 filed on Jun. 5, 2017; U.S. Provisional Application No. 62/543,108, filed on Aug. 9, 2017; U.S. Provisional Application No. 62/552,620, filed on Aug. 31, 2017; and U.S. Provisional Application No. 62/526,733, filed on Jun. 29, 2017. All of the applications referenced above are hereby incorporated by reference.

TECHNICAL FIELD

The present disclosure relates generally to neural networks, and more specifically to convolutional recurrent neural networks implementing scene-based nonuniformity correction.

BACKGROUND

An artificial neural network is an interconnected group of artificial neurons realized as a method or algorithm to be performed by a computational device.

Convolutional neural networks (CNNs) is one type of a feed-forward artificial neural network. CNNs may include collections of neurons, each neuron having a receptive field and collectively tiling an input space. Convolutional neural networks are typically used for pattern recognition and input classification.

Recurrent neural networks (RNNs) is another class of an artificial neural network, which includes a cyclical connection between nodes or units of the network. The cyclical connection creates an internal state that may serve as a memory that enables recurrent neural networks to model dynamical systems. That is, cyclical connections offer recurrent neural networks the ability to encode memory. Thus, if successfully trained, recurrent neural networks may be specified for sequence learning applications. As a prime example, an RNN may be used to implement a long short-term memory (LSTM), which is applicable in classification systems.

Another class of an artificial neural network is a combination of RNN and CNN, which are typically referred to as convolutional recurrent neural networks (CRNN). There are a number of different ways to implement a CRNN, an example of which is illustrated in FIG. 1.

Unlike a traditional feed forward neural network, in the CRNN 100, all inputs 101 and outputs 102 are dependent on each other. In the CRNN 100, the same computation task is performed, by a CNN 103, for every element of a sequence, with the outputs being depended on the previous computations. This is achieved through the use of a memory 104 which captures information about what has been calculated so far. The memory 104 allows for the network to maintain rich historical contexts in dynamical systems. The dependencies between past and future computations are further achieved by the recurrent input 105 and the recurrent update 106. Therefore, the recurrent input 105 is often referred to as a hidden state, because it has to be stored in the memory 104 between the time steps, and is solely determined by the CNN 103 as a response to (possibly infinite) series of external input signals fed to the network in the preceding time steps.

Although recurrent neural networks (RNNs) have been used successfully in one-dimensional systems (such as audio processing, text analysis and interpretation, translators, interactive chat, etc.), the combined use of convolutional networks with recurrent connections for processing 2D (and 3D) video sequences is still very limited. The main reason for this deficiency is the difficulty in training CRNN networks.

Typically, the training of an RNN (and hence CRNN), is often performed by back-propagation. This requires unfolding (or unrolling) the network into several instances. Schematically, unrolling of a CRNN is shown in FIG. 2. In this example, the number of instances is 'T'.

The training of an unrolled CRNN can be performed in the same way, as the training of a feed forward network using gradient Backpropagation algorithms. These algorithms are used to propagate gradients in a feedforward computational graph, where time step layer parameters are shared across all timestep instances. Usually, CRNN unrolling produces large network graphs that are difficult to optimize, due to increased computational and memory requirements. Therefore, current implementations of CRNNs are limited to shallow and simple architectures, or to fewer unrolling steps, which significantly reduces CRNN accuracy and applicability. To be specific, at the current time, there are no real-time video processing applications utilizing CRNNs reported in the literature. Fortunately, for some tasks (like image quality enhancement, or noise suppression), it is possible to design lightweight networks that are easier to unroll and train on currently available hardware.

It would therefore be advantageous to provide a CRNN-based solution for video processing that overcomes the training-related challenges noted above.

SUMMARY

A summary of several example embodiments of the disclosure follows. This summary is provided for the convenience of the reader to facilitate a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for correcting nonuniformity noise in thermal images. The method comprises receiving a current image being part of a stream of thermal images; concatenating the current image from the stream of thermal images with hidden state images; processing, by a first convolutional neural network, the concatenated image to extract a number of feature channels; generating based on the feature channels at least a first multiplicative mask; processing, by a second convolutional neural network, a masked concatenated image to compute a weighting parameter, wherein the masked concatenated image is resulted by applying the first multiplicative mask on the concatenated image; and simulating, using the weighting parameter, an infinite impulse response (IIR)-style updating scheme to estimate the nonuniformity noise in the current image.

Certain embodiments disclosed herein include an apparatus for correcting nonuniformity noise in thermal images. The apparatus comprises a processing circuitry; and a memory, the memory containing instructions that, when executed by the processing circuitry, configure the electronic circuit to: receive a current image being part of a stream of thermal images; concatenate the current image from the stream of thermal images with hidden state images; process the concatenated image to extract a number of feature channels; generate based on the feature channels at least a first multiplicative mask; process a masked concatenated image to compute a weighting parameter, wherein the masked concatenated image is resulted by applying the first multiplicative mask on the concatenated image; and simulate using the weighting parameter, an infinite impulse response (IIR)-style updating scheme to estimate the nonuniformity noise in the current image.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
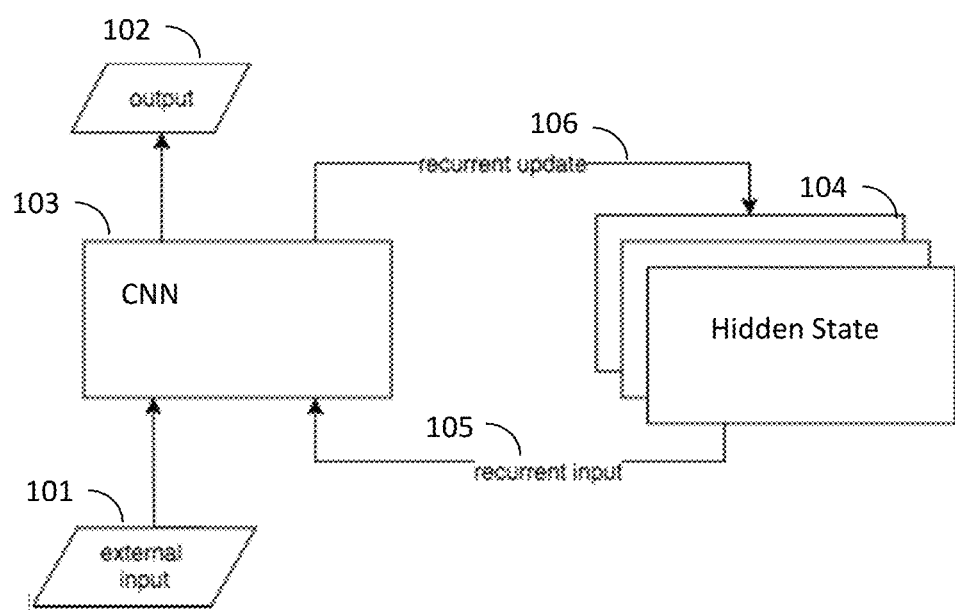
FIG. 1 is a diagram of a convolutional recurrent neural network.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

By way of example to the disclosed embodiments, the scene-based nonuniformity correction performed using a CRNN is disclosed. The correction, in an embodiment, is performed on thermal images captured using a shutterless far-infrared (FIR) camera to allow a proper shutterless operation. The CRNN may be implemented in an integrated circuit (IC) that is part of the camera or operates as a stand-alone computer.

The proposed CRNN, designed and configured according to the disclosed embodiments, is utilized for correcting fixed pattern noise (FPN), including residual nonuniformity. The FPN correction is based on 2-points correction, which provides knowledge for non-uniform pixel gains and offsets. Pixel offsets are estimated by smoothing or uniforming image areas, which are detected within video frames. As a scene changes, the locations of the smooth regions migrate, which, after a sufficient period of time, allows the algorithm to correct offset errors (e.g., the residual noise) in the entire image. An example embodiment for an FPN correction is discussed in Ser. No. 16/058,643 referenced above.

The reference scene-based nonuniformity correction uses the fact that the residual noise in each pixel is uncorrelated with noise in its neighbors. On the other hand, images of real scenes contain many smooth regions. Thus, based on the disclosed embodiments, the proposed CRNN network can be trained to detect the noise in smooth regions in the image and estimate the noise correction that would flatten such regions. Further, the network can be trained to estimate the noise incrementally, where each image (frame) contributes only a small portion of the final result. As such, consistent FPN patterns can be enhanced, while scene-related distortions can be averaged out, because they are uncorrelated in the long run.

To perform the scene-based nonuniformity correction, the CRNN disclosed herein is configured to detect smooth regions to learn or otherwise estimate the noise patterns and detect regions that undergo changes, as some regions will not change from frame to frame even during motion. The estimation of the noise is performed when the camera (hence the vehicle) is in motion. The CRNN can be trained to detect and correct residual noise composed of low and/or high frequencies.

The following algorithm is one example for a nonuniformity correction algorithm that can be implemented by the CRNN. According to the reference design, the residual nonuniformity can be estimated within an image at a specific time ($D_t$), and can be represented as follows:

$$D_t = \alpha \cdot D_{t-1} + (1-\alpha) \cdot D_{curr} \qquad \text{Eq. 1}$$

where, $D_t$ is the noise estimated at time t, $D_{t-1}$ is the noise previously estimated at time t−1, $D_{curr}$ the noise estimated from the currently captured image, and $\alpha$ a learning rate having a scalar value from 0 to 1. At time t=0, the value is $D_t$ is 0. The value $D_{curr}$ can be represented as follows:

$$D_{curr} = H(I_{curr}, D_{t-1}) \cdot M \qquad \text{Eq. 2}$$

where H is an operator that updates the estimation of fixed pattern noise by analyzing current image $I_{curr}$, and the previous noise estimate $D_{t-1}$. In an embodiment, $D_{curr}$ is computed by applying a nonlinear high-pass filter on $I_{curr}$. The computation of $D_{curr}$ is performed for every pixel in the image. In an embodiment, bad and saturated pixels are excluded from the computation by including them in the mask M. Here, the mask M is a matrix containing factors that weight pixels in the image that are designated to be included in the calculation of the residual nonuniformity present in the current image. The mask M is based on a combination of four different factors. In such an embodiment, the mask M can be represented as follows:

$$M = M_{sat} \cdot M_b \cdot M_{edge} \cdot M_t \quad \text{Eq. 3}$$

where $M_{sat}$ is a mask without over-saturated pixels, $M_b$ is a mask representing excluded "bad pixels", $M_{edge}$ contains weights that inhibit strong edges, and $M_t$ is weight inhibiting regions lacking temporal changes. All of $M_{sat}$, $M_b$, $M_{edge}$, $M_t$ are matrices. In an embodiment, M is a weight matrix with high values corresponding to pixels in which the noise estimation is facilitated and low values corresponding to pixels where the noise estimation is inhibited.

$M_{sat}$ and $M_b$, represent the oversaturated and 'bad' pixels that have been identified by analyzing the image, and are removed from the image regions of which are used to calculate the scene-based nonuniformity correction. 'Bad pixels' are pixels within the image that are known a priori to be defective. These pixels are removed from the calculation by applying a mask $M_b$ on the image. In contrast, $M_{edge}$ and $M_t$ inhibit "live" pixels that are determined to come from regions that have edges that are too strong or are not sufficiently dynamic.

The mask $M_{edge}$ is calculated by comparing a pixel to its neighboring pixels, for example creating a q×q (where q is an integer greater than 1) matrix around the pixel, and determining if there is a significant gap in pixel value.

The mask $M_t$ represents regions with limited changes between a current image and a previous image. For example, if a low contrast depiction of a distant mountain in a first image stays stationary relative to a second image, the corresponding pixels are inhibited to reduce their contribution to the calculation, as they do not represent significant changes within the image. However, if a moving object within the foreground of the frame changes position between the first and the second image, those pixels are not inhibited, allowing calculation of noise from the changes within the image.

In the above discussed reference algorithm, the multiplicative maps, the parameter α, and the filter are set a priori and typically are not adjusted in response to the incoming images. An improvement of such an algorithm may be accomplished by a CRNN designed according to the disclosed embodiments. In an embodiment, the CRNN is designed to function similarly to gated recurrent units (GRU).

Figure 3:
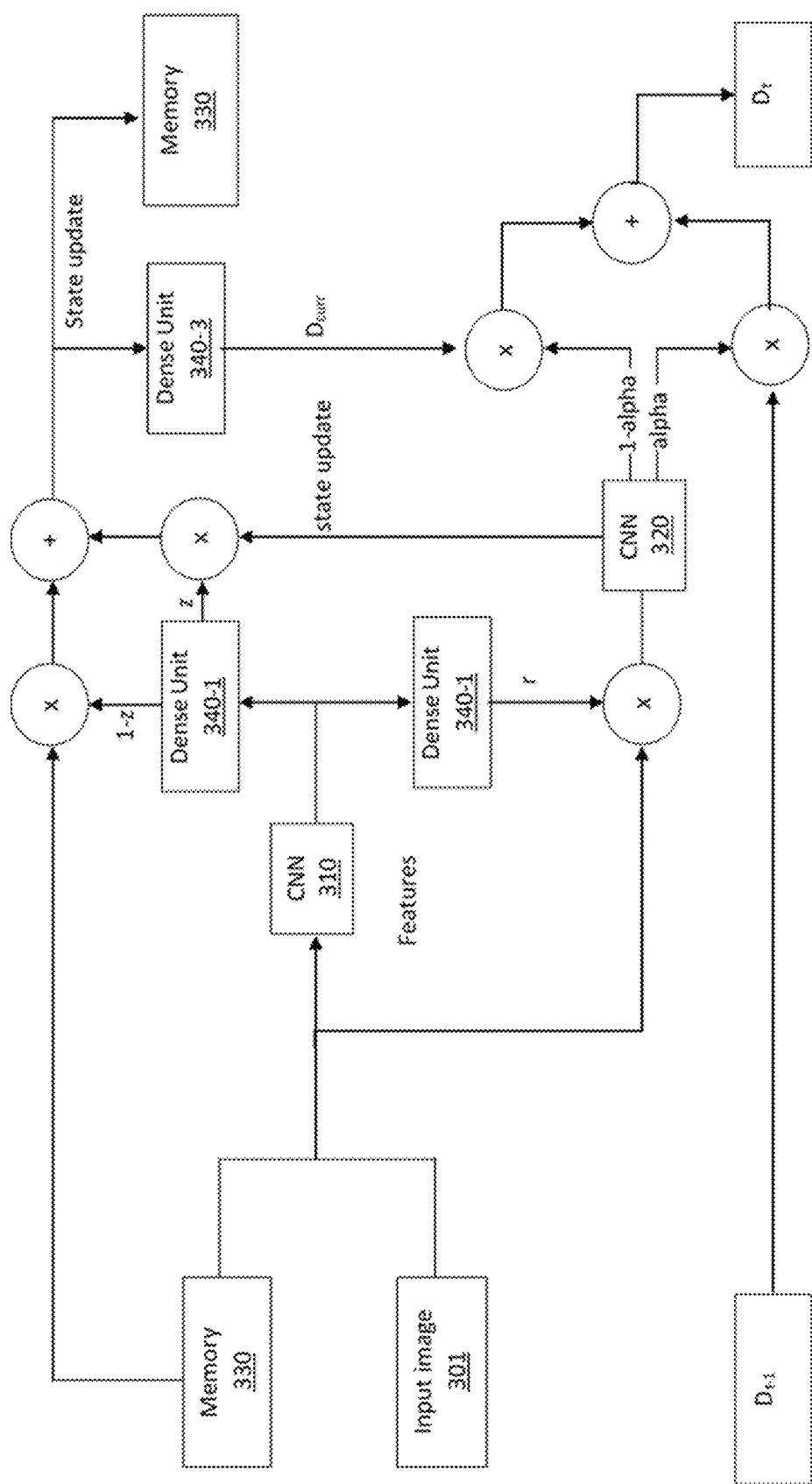
FIG. 3 is a diagram of a convolutional recurrent neural network utilized to perform scene-based nonuniformity corrections according to an embodiment.

FIG. 3 shows an example block diagram of a CRNN 300 configured to correct residual nonuniformity noise in thermal images according to an embodiment. The nonuniformity correction, in an example embodiment, is applied to thermal images (frames) captured by a FIR camera. The camera may be in motion.

The CRNN 300 includes a first CNN 310 and a second CNN 320, a memory 330, and dense units 340-1 through 340-3. The CRNN 300 is further configured with multipliers and adders. Input 301 to the CRNN 300 is an image, the output is estimated noise at time t, which is Dt, the recurrent update is $D_{curr}$, and the recurrent input is $D_{t-1}$. It should be noted that the input 101 includes series of images (frames) sequentially fed into the CRNN 300. The CNNs 310 and 320 are configured with a plurality of layers. Such layers may be any combination of convolutional, pooling, and/or affine layers. An example configuration of the CNNs 310 and 320 are provided in FIGS. 4A and 4B.

The memory 330 is the hidden state of the CRNN and is represented by a number of hidden-state images. In an example embodiment, the number of hidden-state images is three (3). The memory 300 also maintains an estimated residual nonuniformity estimate image. Thus, in an example embodiment, the number of hidden state images in the memory 330 is four (4). The hidden state (contents of the memory 330) is iteratively updated by the CRNN 300 in response to images received as input 101.

In an example embodiment, each of the dense units 340 are 1×1 convolutions that act like fully connected layers on the feature channels provided by the CNN 310. The dense units 340 are used to match input channel numbers to output channel numbers. For example, the dense unit 340-1 is configured to map 4 output feature channels to 3 state image channels and the dense unit 340-2 is configured to map 4 feature channels to 4 channels of a multiplicative map computed by this unit. The feature channels are output by the CNN 320-1.

In an embodiment, the dense units 340-1 and 340-2 are responsible for computing the pixel masks, while the dense unit 340-3 implements the nonlinear convolutional filter designed to compute fixed pattern noise updates. The images from the memory 330 are concatenated with the input frame 310 and are fed into the CNN 310. The CNN 310 is responsible for the gating mechanism of the dense units 340-1 and 340-2. The output channels of the CNN 320 are fed into two dense units 340-1 and 340-2 that produce multiplicative maps 'z' and 'r', respectively. The multiplicative maps 'z' and 'r' control which information is allowed to flow from the previous state and the new frame to the next state.

In an embodiment, the 'z' multiplicative map, provided by the dense unit 340-1 includes a set of pixel masks determining how many pixels from previous state would be retained from the previous state and how many pixels would be updated/replaced by the new response. The set of pixel multiplicative map 'r', produced by the dense unit 340-2, controls which pixels need to be reweighted before they are fed into the CNN 320. That is, the multiplicative map 'r' is utilized to select pixels that would participate for the calculation of the new state and noise estimation updates.

In a separate branch, the CNN 320 receives the concatenated images multiplied by the multiplicative map 'r' and computes the weighting scalar parameter α. This parameter controls infinite impulse response (IIR)-style updating scheme for the final estimation of $D_t$. The CNN 320 also outputs the candidate update for the state of the images, i.e., how the contents of the memory 330 should be updated.

According to the disclosed embodiments, the multiplicative maps 'r' and 'z' and the feature channels are learned during a training phase of the CRNN 300. As noted above, the training includes unrolling the network to T instances where each instance is independently trained. In an embodiment, the training is performed by minimizing a loss function designed to measure an error between the images corrected by the CRNN (via subtraction of the estimated FPN) and clean ground truth images. The noisy input images are synthesized by adding FPN to the clean ground truth images.

In an embodiment, a last output hidden state is stored in the memory 330 and fed as an initial state in the next training iteration. The very first time, the initial state is zero-initialized. This creates the need to perform the training in batches of T successive frames, which differs from regular CNN training, where input images are selected randomly from a given training dataset.

It should be appreciated that the CRNN 300 implements the SBNR algorithm discussed above. The matrix mask 'M' can be implemented by the multiplicative maps 'r' and 'z', while the state update determined by the CNN is equivalent to the operator H is an operator that extracts high frequency noise from a current image. The output is computed by the CRNN according to Eq. 1 above.

It should be appreciated that the CRNN 300 can be implemented using a neural network that can be executed over or realized by a dedicated hardware, or even a general-purpose CPUs, mainly because the implementation is based on very few channels, specifically 4 channels, as opposed to tens or hundreds used in a typical CNN application. Examples for such hardware include analog or digital neuro-computers. Such computers may be realized using any one of a combination of electronic components, optical components a von-Neumann multiprocessor, a graphical processing unit (GPU), a vector processor, an array processor, a tensor processing unit, and the like.

Figure 4A:
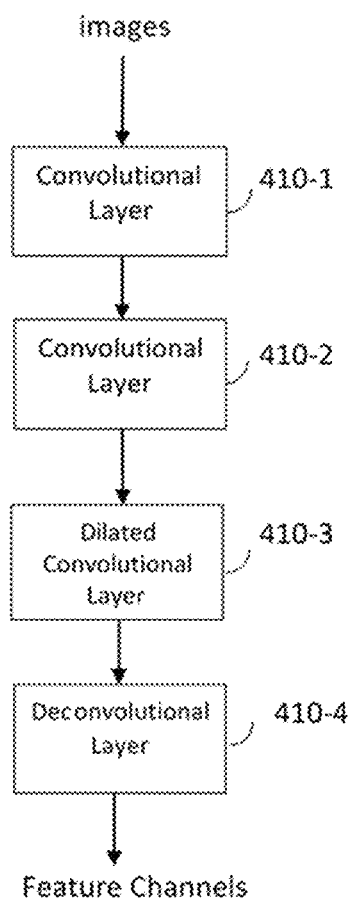
FIGS. 4A and 4B are example diagrams of convolutional recurrent neural networks configured according to an embodiment.

FIG. 4A shows an example diagram of the CNN 310 according to an embodiment. The CNN 310 is configured to include 4 layers 410-1 through 410-4 connected to extract features from local regions of an input images. In an example embodiment, the CNN 310 outputs four (4) channels of a feature image. In order to reduce the memory used, the CNN 310 is configured as follows: a first layer 410-1 is a 3×3 convolutional layer with a stride size 1; a second layer 410-2 is a 3×3 convolutional layer with a stride size 2; a third layer 410-3 is a 3×3 dilated convolutional layer with a dilation factor of 2, 3, or 5, and a fourth layer 410-4 is a 3×3 deconvolution/upsampling layer with a stride size 0.5. Rectified Linear Unit (ReLU) nonlinearity function follows each convolutional layer.

Figure 4B:
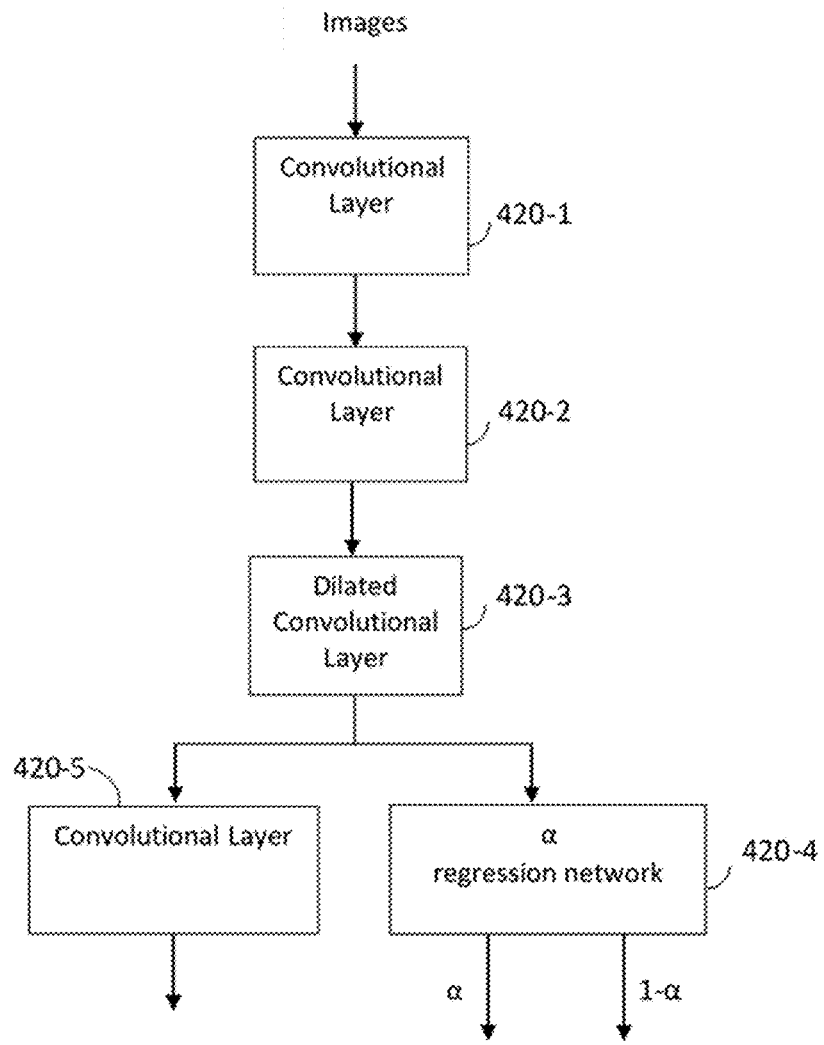

FIG. 4B shows an example diagram of the CNN 320 designed according to an embodiment. The CNN 320 includes 4 layers 420-1 through 420-4 connected to extract features from local regions of an input images. In an example embodiment, the layers 420-1 through 420-4 are configured as the layers 410-1 through 410-4 respectively. The CNN 320 also includes a regression network 420-5 to compute the weighting parameter $\alpha$, which is a scalar value.

It should be noted that architectures shown in FIGS. 4A and 4B including 4 convolutional layers are merely examples as other neural network architectures may be considered as well. For example, each CNN may include a different number of layers and/or different types of layers.

Figure 5:
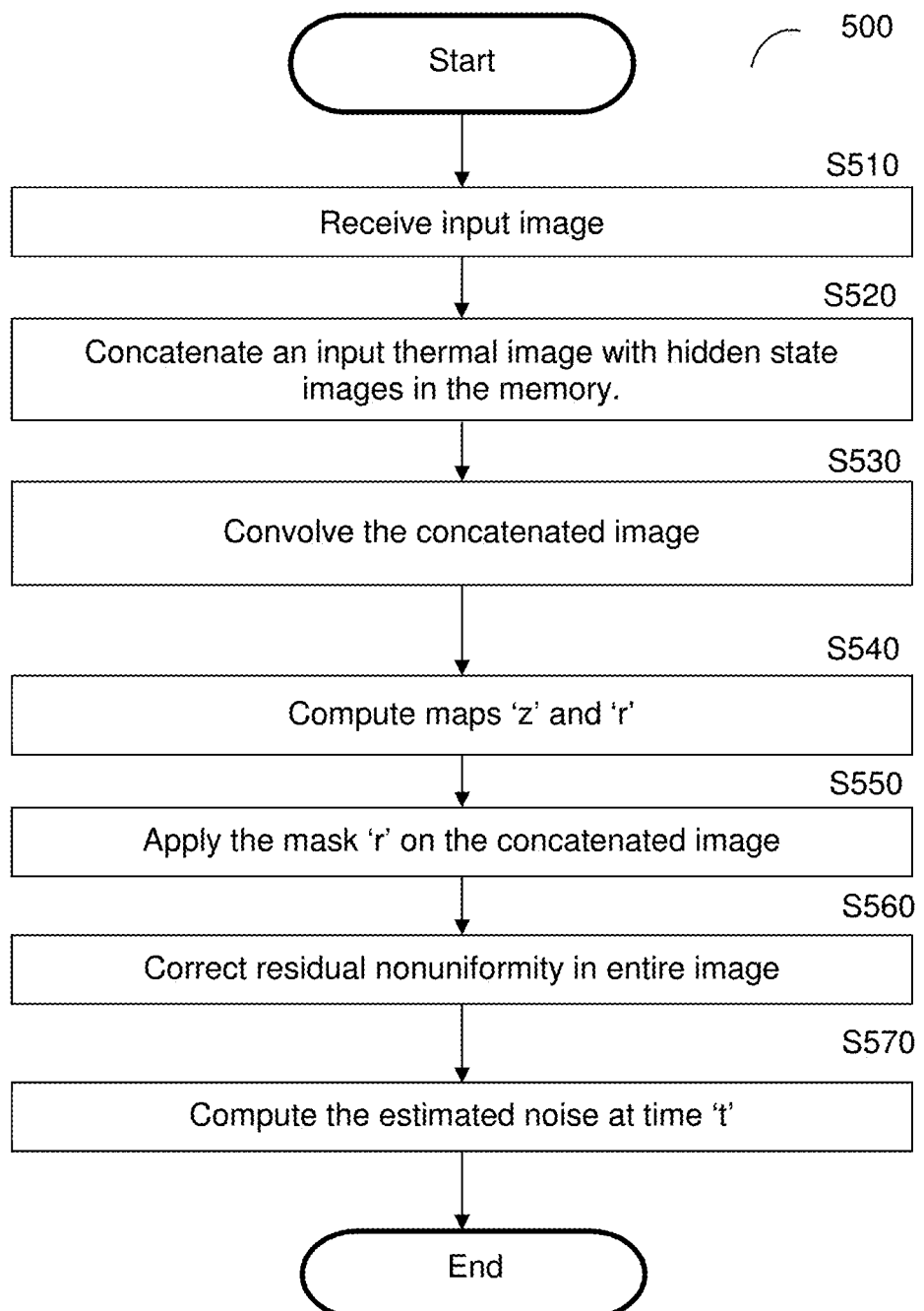
FIG. 5 shows a flowchart illustrating a method for performing a scene-based nonuniformity correction according to an embodiment.

FIG. 5 shows an example flowchart 500 illustrating a method for correcting residual nonuniformity according to an embodiment. The method is performed by a CRNN that may be configured as discussed with reference to FIG. 3. Prior to executing the method, the CRNN is trained to at least set initial values for the hidden image state and the multiplicative maps 'z' and 'r'. In an embodiment, the CRNN can be trained on images including low frequencies noise, high frequencies noise, or both.

At S510, a thermal image I is received from a FIR sensor. This may include receiving a stream of thermal images or a video frame. The method equally operates on thermal images that are received from the FIR sensor.

At S520, the input thermal image is concatenated with the hidden state images in the memory. The concatenated image is fed into two independent CNNs, for example, CNNs 310 and 320 of FIGS. 3 and 4.

At S530, the concatenated image is convolved by a first CNN to extract a number of feature channels. The feature channels are utilized to estimate the noise in the current received image. In an example embodiment, the number of feature channels is 4. At S540, the gating signals (multiplicative maps) 'z' and 'r' are computed. The output feature channels are utilized to produce multiplicative maps 'z' and 'r' that can act as masks for noise correction. The multiplicative map 'z' weighs which pixels from previous state images would propagate to the next state images versus which pixels need to be updated. The multiplicative map 'r' utilized for the selection of pixels (regions) that would participate in the calculation of the new state and estimated image noise updates. In an embodiment, S540 includes mapping N feature channels (e.g., 4 channels) to N−1 state image channels (e.g., 3 channels) to compute the multiplicative map 'z'. Further, the N feature channels (e.g., 4 channels) are mapped to N feature channels (e.g., 4 channels) of the multiplicative map 'r'.

At S550, the multiplicative map 'r' is multiplied with the concatenated image and the result is fed to a second CNN. At S560, the resulted image is convolved by second CNN to determine a state update utilized to update the hidden state images in the memory and the estimated noise in the current image (Dcurr). In an embodiment, S560 further includes computing the weighting scalar parameter $\alpha$.

At S570, the estimated noise at time 't' (Dt) is computed. The computation may be based on Equation 1 (Eq. 1), which simulates an infinite impulse response (IIR)-style updating scheme for the final estimation of Dt.

Figure 6A:
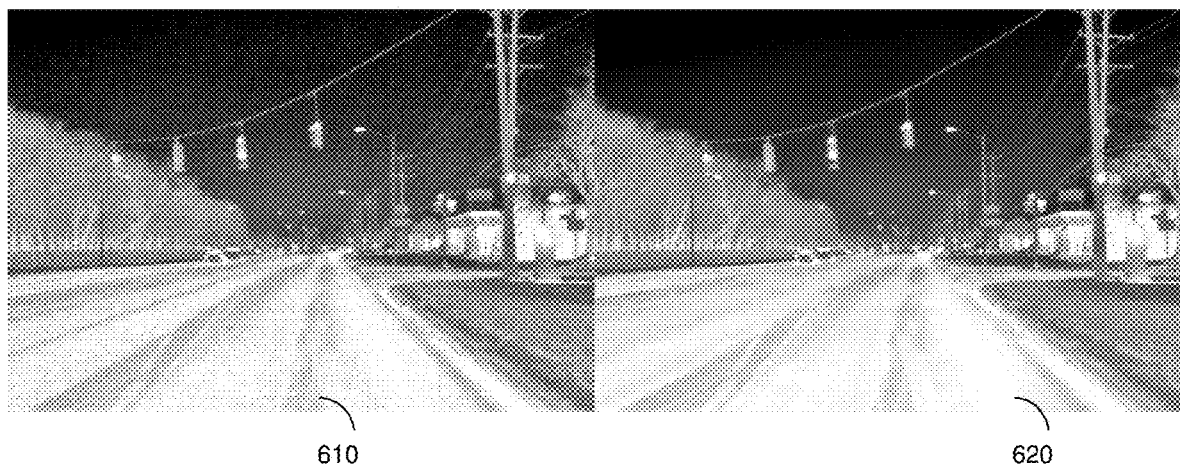
FIG. 6A shows example screenshots of an image before and after a scene-based nonuniformity correction has been applied thereto.
Figure 6B:
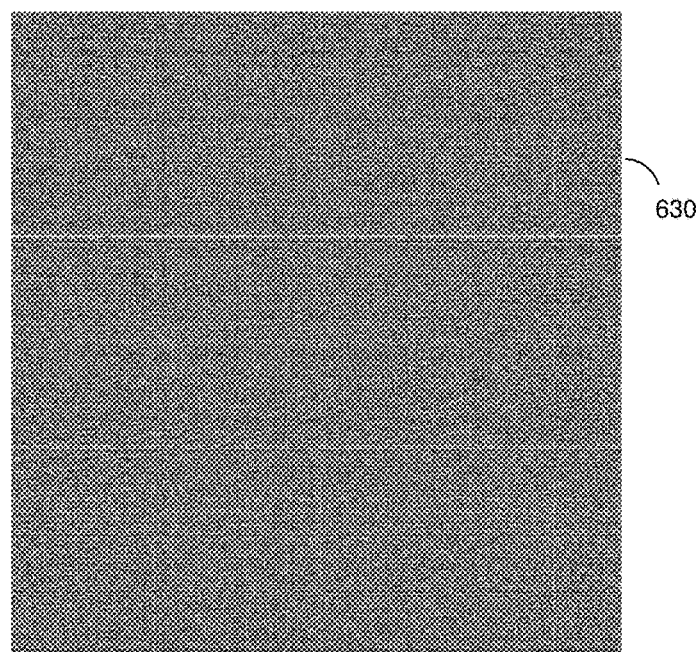
FIG. 6B shows a screenshot of the residual nonuniformity estimated by the disclosed correction method on an image shown in FIG. 6A.

FIG. 6A show screenshots demonstrating the disclosed techniques in use. FIG. 6A shows an example input image 610 having residual nonuniformity present before a correction and an output image 620 after a correction has been applied thereto. FIG. 6B shows an example image 630 representing, in part, the residual nonuniformity that has been estimated from the initial image 610 based on the techniques discussed herein.

Figure 7:
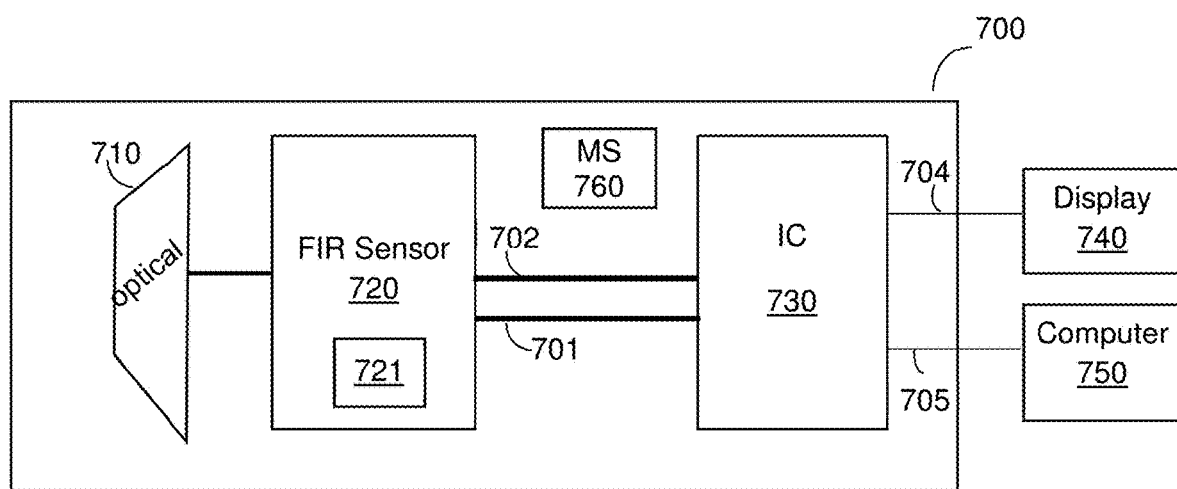
FIG. 7 is a block diagram of a FIR camera adapted to carry the disclosed embodiments.

FIG. 7 shows an example block diagram of a FIR camera 700 that can implement the various disclosed embodiments. In an embodiment, the FIR camera 700 includes an optical unit 710 and a FIR sensor 720 coupled to an integrated circuit (IC) 730. The output of the FIR camera 700 is a video stream of thermal images (thermal video stream) captured by the FIR sensor 720 and processed by the IC 730. The FIR camera is optimized to operate or be integrated in advanced driver assistance systems and autonomous vehicles systems (collectively referred to hereinafter as AVS systems).

In a configuration, two thermal video streams are output by the FIR camera 700. A first stream 704 includes thermal images captured by the FIR sensor 720 and processed by the IC 730 for the shutterless correction and image enhancement. As an example, the first thermal video stream 704 is an 8-bit grayscale video stream. The first thermal video stream 704 is fed to a display 740 which may be a screen disposed on a dashboard of a vehicle.

A second thermal video stream 705 is captured by the FIR sensor 720 and processed by the IC 730 for the shutterless nonuniformity correction of the FIR sensor 720. As an example, the second thermal video stream 705 is a 14-bit data stream that is fed to a computer 750 for computer vision processing. Specifically, the computer 750 may be configured to execute various computer vision algorithms related to advanced driver assistance and autonomous systems and applications. The algorithms may include, but are not limited to, detection of objects, obstacles, or hazards on a road. For example, the processed thermal video stream as output by the FIR camera 700 can be utilized for the detection of vehicles, pedestrians, animals, two-wheelers, black-ice spots, litter, debris, potholes, gully covers, curbs and so on.

As will be discussed below, the processing performed by the IC 730 enhances the quality of the captured thermal images to allow for the accurate and fast detection of objects, obstacles and hazards on the road. The processing by the IC 730 ensures passive detection of objects during daytime and nighttime in all weather conditions. To this end, the IC 730 is configured to perform one or more image processing tasks. One such task includes, but is not limited to, shutterless correction of the FIR thermal images captured by the FIR sensor 720.

As demonstrated in FIG. 1, the FIR camera 700 does not include a shutter (or any moving part that can be viewed as shutter). The shutterless correction executed by the IC 730 allows for the performance of a flat-field correction without the use of a shutter. That is, shutterless correction allows for a FIR image with unwanted noise removed therefrom.

It should be appreciated that the shutterless FIR camera 700 is mechanically reliable and meets safety standards required for advanced driver assistance and autonomous systems. Further, the absence of a shutter allows for a FIR camera design with a small form factor, as well as mechanical failure safety, as there is no need to include moving parts in the design.

In one configuration, the optical unit 710 includes one or more lens elements, each of which having a predetermined field of view. In an embodiment, the lens elements are chalcogenide. The lens may be protected by a protective window (not shown in FIG. 1). Further, to prevent icing of the optical unit 710 it may be covered by a heating means (not shown in FIG. 1). The heating means may include a wire or a coil.

The FIR sensor 720 is an uncooled FIR sensor. That is, the sensor 720 operates in the FIR (far-infrared) spectrum with a wavelength of 7.0 μm-14.0 μm. In an example configuration, the FIR sensor 720 is coupled through an input bus 701 to the IC 730 to input the captured FIR images and metadata. In an embodiment, a junction temperature sensor 721 is included in an enclosure of the FIR sensor 720 to measure the junction temperature therein.

A control bus 702 is also connected between the FIR sensor 720 and the IC 730. On the control bus 702, signals related to the status of the sensor 720, clock, synchronization, and other digital control signals are transferred. In an embodiment, the control bus 702 may carry analog signals indicating, for example, the current ambient temperature of the FIR sensor 720. Alternatively, the analog signal may not be part of the control bus 702.

Figure 2:
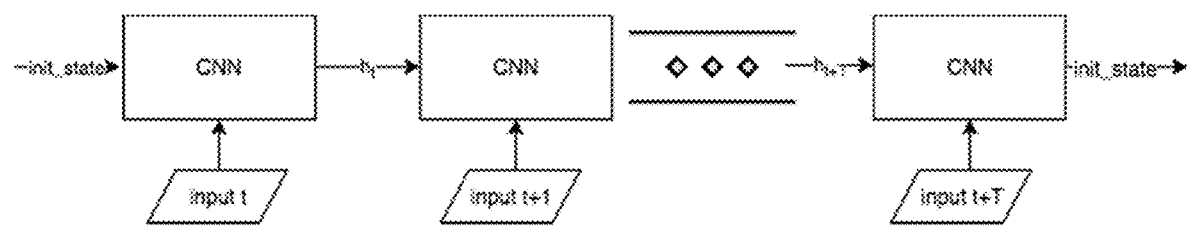
FIG. 2 is a diagram of an unrolled convolutional recurrent neural network.

The IC 730 includes a memory, a processing circuitry, and various circuits and modules configured for the execution of the tasks noted above. A detailed block diagram of the IC 730 is provided in FIG. 2. The IC 730 may be realized as a chipset, a system on a chip (SoC), a field programmable gate array (FPGA), a programmable logic device (PLD), an application specific integrated circuit (ASIC) or any other type of digital and/or analog hardware components.

The CRNN (300, FIG. 3) can be integrated in the IC to correct nonuniformity noise in images captured by the FIG sensor 720.

The FIR sensor 720 and IC 730 are encapsulated in a thermal core (not shown). The thermal core is utilized to ensure a uniform temperature for the FIR camera 700. The temperature calibration of the thermal core is performed during the calibration mode. The optical unit 710 is typically assembled in the FIR camera 700 after the FIR sensor 720 and IC 730 are encapsulated in the thermal core.

It should be appreciated that the CRNN disclosed according to some embodiments, when integrated in the IC 730, can be adapted to perform other image correction processes to enhance the quality of the captured thermal images to allow for accurate and fast detection of objects, obstacles and hazards on the road. Such processes include, but are not limited to, shutterless correction, sunburn protection, bad pixel replacement, near field correction, temporal denoising, spatial denoising, edge enhancement, automatic gain control, local contrast, enhancement, and brightness and polarity adjustment.

It should be further appreciated that the CRNN disclosed according to some embodiments, when integrated in the compute 750, can be adapted to perform tasks related to detection of objects, such as obstacles, hazards or other objects on a road.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for correcting nonuniformity noise in thermal images, comprising:

receiving a current image being part of a stream of thermal images;

concatenating the current image from the stream of thermal images with hidden state images;

processing, by a first convolutional neural network, the concatenated image to extract a number of feature channels;

generating based on the feature channels at least a first multiplicative mask;

processing, by a second convolutional neural network, a masked concatenated image to compute a weighting parameter, wherein the masked concatenated image is resulted by applying the first multiplicative mask on the concatenated image; and simulating, using the weighting parameter, an infinite impulse response (IIR)-style updating scheme to estimate the nonuniformity noise in the current image.

2. The method of claim 1, further comprising:
correcting the nonuniformity of the current image based on the estimated nonuniformity noise.

3. The method of claim 1, further comprising:
processing, by the second convolutional neural network, a masked concatenated image to determine a recurrent state update.

4. The method of claim 3, further comprising:
generating based on the feature channels a second multiplicative mask applied on the hidden state images and the recurrent state update; and
processing, by the second convolutional neural network, an updated state applied on the masked hidden state images, thereby updating the hidden state images.

5. The method of claim 4, wherein the recurrent state update, the first convolutional neural network and the convolutional neural network form a recurrent convolutional neural network.

6. The method of claim 4, further comprising:
training the recurrent convolutional neural network with at least thermal images characterized by nonuniformity noise.

7. The method of claim 6, wherein training of the recurrent convolutional neural network further comprises: determining an initial value for initial values for the hidden image states and the first and second multiplicative mask.

8. The method of claim 1, wherein the stream of thermal images are far-infrared (FIR) images captured by a FIR sensor.

9. A non-transitory computer readable medium having stored thereon instructions for causing a processing circuitry to perform the method of claim 1.

10. An apparatus for correcting nonuniformity noise in thermal images, comprising:
a processing circuitry; and
a memory, the memory containing instructions that, when executed by the processing circuitry, configure the electronic circuit to:
receive a current image being part of a stream of thermal images;
concatenate the current image from the stream of thermal images with hidden state images;
process the concatenated image to extract a number of feature channels;
generate based on the feature channels at least a first multiplicative mask;
process a masked concatenated image to compute a weighting parameter, wherein the masked concatenated image is resulted by applying the first multiplicative mask on the concatenated image; and
simulate using the weighting parameter, an infinite impulse response (IIR)-style updating scheme to estimate the nonuniformity noise in the current image.

11. The apparatus of claim 10, wherein the apparatus is further configured to:
correct the nonuniformity of the current image based on the estimated nonuniformity noise.

12. The apparatus of claim 10, wherein the apparatus is further configured to:
process a masked concatenated image to determine a recurrent state update.

13. The apparatus of claim 10, wherein the apparatus is further configured to:
generate based on the feature channels a second multiplicative mask applied on the hidden state images and the recurrent state update; and
process an updated state applied on the masked hidden state images, thereby updating the hidden state images.

14. The apparatus of claim 10, wherein the memory is configured to maintain the hidden state images and processing circuitry implements a first convolutional neural network and a second convolutional neural network, thereby the apparatus carries a recurrent convolutional neural network.

15. The apparatus of claim 14, wherein the apparatus is further configured to:
train the recurrent convolutional neural network with at least thermal images characterized by nonuniformity noise to at least determine an initial value for initial values for the hidden image states and the first and second multiplicative mask.

16. The apparatus of claim 10, wherein the processing circuitry is any one of: an a von-Neumann multiprocessor, a graphical processing unit (GPU), a vector processor, an array processor, and a tensor processing unit.

17. The apparatus of claim 10, wherein the stream of thermal images are far-infrared (FIR) images captured by a FIR sensor.

18. The apparatus of claim 10, wherein the apparatus is integrated in a shutterless FIR camera.

19. The apparatus of claim 10, wherein the apparatus is integrated in computer connected to a shutterless FIR camera.

* * * * *